(12) United States Patent
Zhao et al.

(10) Patent No.: US 10,541,595 B2
(45) Date of Patent: Jan. 21, 2020

(54) DOUBLE STATOR PERMANENT MAGNET LINEAR MOTOR AND DESIGN METHOD FOR INCREASING MAGNETIC FIELD MODULATION

(71) Applicant: JIANGSU UNIVERSITY, Jiangsu (CN)

(72) Inventors: Wenxiang Zhao, Jiangsu (CN); Jian Zhu, Jiangsu (CN); Jinghua Ji, Jiangsu (CN); Guohai Liu, Jiangsu (CN); Zhengmeng Liu, Jiangsu (CN); Qian Chen, Jiangsu (CN); Jinwei Chen, Jiangsu (CN)

(73) Assignee: JIANGSU UNIVERSITY (CN)

( * ) Notice: Subject to any disclaimer, the term of this patent is extended or adjusted under 35 U.S.C. 154(b) by 65 days.

(21) Appl. No.: 15/776,397

(22) PCT Filed: Dec. 9, 2015

(86) PCT No.: PCT/CN2015/096778
§ 371 (c)(1),
(2) Date: May 15, 2018

(87) PCT Pub. No.: WO2017/084125
PCT Pub. Date: May 26, 2017

(65) Prior Publication Data
US 2018/0301968 A1    Oct. 18, 2018

(30) Foreign Application Priority Data

Nov. 16, 2015 (CN) .......................... 2015 1 0786971

(51) Int. Cl.
*H02K 41/03*    (2006.01)
*H02K 21/44*    (2006.01)

(52) U.S. Cl.
CPC ........... *H02K 41/033* (2013.01); *H02K 21/44* (2013.01); *H02K 41/031* (2013.01); *H02K 2213/03* (2013.01)

(58) Field of Classification Search
CPC ...... H02K 41/03; H02K 41/031; H02K 16/02; H02K 21/38; H02K 33/00; B23Q 5/28
(Continued)

(56) References Cited

U.S. PATENT DOCUMENTS 4,972,108 A * 11/1990 Venturini ............. H02K 41/033
                                                    310/12.18
6,093,992 A *  7/2000 Akemakou .......... H02K 21/042
                                                    310/181
(Continued)

FOREIGN PATENT DOCUMENTS

CN    101783573    7/2010    .............. H02K 1/14
CN    102044951    5/2011    ............. H02K 41/03
(Continued)

OTHER PUBLICATIONS

International Preliminary Report on Patentability issued in application No. PCT/CN2015/096778, dated May 22, 2018 (13 pgs).
(Continued)

*Primary Examiner* — Burton S Mullins
(74) *Attorney, Agent, or Firm* — Hayes Soloway P.C.

(57) ABSTRACT

Disclosed is a double-stator linear vernier permanent magnet (DS-LVPM) motor and method to increase the magnetic field modulation effect. The motor contains a primary, and first and second secondaries on both sides of the primary, spaced by an air gap. The motor secondary includes modulation teeth. The primary is bilaterally symmetrical, and permanent magnets (PM) are embedded in the yoke of the primary core elements. The design solves the inherent problem of flux leakage at the end of PMs for conventional (Continued)

VPM motors, so as to improve utilization of PMs, thereby increasing thrust density of the motors. Additionally, the motor secondaries are laminated by silicon steel sheet, which saves PM material and significantly reduces cost for linear long stroke applications. By adjusting PM structure parameters, the design can use finite element method (FEM) to calculate repeatedly to get PM structure parameters corresponding to maximum electromotive force (EMF).

20 Claims, 5 Drawing Sheets

(58) Field of Classification Search
USPC .............................. 310/12.15, 12.17, 12.18
See application file for complete search history.

(56) References Cited

U.S. PATENT DOCUMENTS

| | | | | |
|---|---|---|---|---|
| 6,522,035 B1* | 2/2003 | Smit | ...................... | H02K 41/03 |
| | | | | 310/12.18 |
| 7,154,198 B2* | 12/2006 | Kawai | ................... | H02K 41/03 |
| | | | | 310/12.15 |
| 7,230,355 B2* | 6/2007 | Lin | ...................... | H02K 41/033 |
| | | | | 310/12.01 |
| 7,800,256 B2* | 9/2010 | Jajtic | ........................ | H02K 1/06 |
| | | | | 310/12.01 |
| 8,164,223 B2* | 4/2012 | Kawai | .................... | H02K 41/03 |
| | | | | 310/12.15 |
| 8,384,252 B2* | 2/2013 | Kakihara | ............. | H02K 41/031 |
| | | | | 310/12.24 |
| 8,593,019 B2* | 11/2013 | Chung | ................... | H02K 16/00 |
| | | | | 310/49.46 |
| 8,624,446 B2* | 1/2014 | Chung | ................. | H02K 41/031 |
| | | | | 310/12.15 |
| 9,281,735 B2* | 3/2016 | Gandhi | ................ | H02K 41/033 |
| 9,692,269 B2* | 6/2017 | Chung | ................... | H02K 21/16 |
| 9,929,631 B2* | 3/2018 | Sugita | .................. | H02K 41/033 |
| 10,256,683 B2* | 4/2019 | Chung | ..................... | H02K 1/24 |
| 2005/0082934 A1 | 4/2005 | Kawai | ........................ | 310/181 |

FOREIGN PATENT DOCUMENTS

| | | | | |
|---|---|---|---|---|
| CN | 203434835 | * | 9/2013 | ............. H02K 41/02 |
| CN | 104052238 | * | 6/2014 | ........... H02K 41/025 |
| CN | 104052238 | | 9/2014 | ................ H02K 1/14 |
| CN | 104779755 | | 7/2015 | ............. H02K 16/04 |
| CN | 104821668 | | 8/2015 | ................ H02K 1/14 |
| CN | 104935148 | | 9/2015 | ............. H02K 41/03 |
| EP | 1919063 | | 5/2008 | ............. H02K 41/02 |

OTHER PUBLICATIONS

International Search Report and Written Opinion (w/translation) issued in application No. PCT/CN2015/096778, dated Aug. 17, 2016 (17 pgs).

* cited by examiner

DOUBLE STATOR PERMANENT MAGNET LINEAR MOTOR AND DESIGN METHOD FOR INCREASING MAGNETIC FIELD MODULATION

TECHNICAL FIELD

The present invention relates to VPM motors and the design method to increase the magnetic field modulation effect, especially to DS-LVPM motor with high thrust density and the design method to increase the magnetic field modulation effect, which is suitable for logistics transportation lines and rail traffic. It belongs to the technical field of a new type of motor manufacturing.

BACKGROUND OF THE PRESENT INVENTION

The existing long-distance logistics transportation lines generally apply low-cost linear induction motors, whose power factor and efficiency are low. The PM structure can improve performance. Since the traditional PM synchronous motors generally use short armature movement, the magnetic pole length is decided by the distance. The application field is extremely limited by the amount of PM and the high cost for long stroke applications. For conventional LVPM motor, the armature windings are located on the secondary and the PMs are located on the primary. It also has the same problems with the traditional PM synchronous motor that the invest cost will be huge in the long stroke applications.

On the other hand, with the deepen studies on the stator PM motors and VPM motors, more attentions are paid to flux-switching, flux-reversal and doubly-salient PM motors and the VPM motors based on magnetic field modulation effect. In these motors, the VPM motor can modulate the low-speed magnetic field into high-speed magnetic field, which has the characteristic of high torque at low speed. However, it has the problems of much magnetic flux leakage, the low utilization of PM and low power factor.

Chinese Invention Patent No. 201010119957.X discloses a long stator primary linear PM motor. In fact, it is a doubly-salient PM linear motor. The PM field is unipolar and PMs and windings are placed on the primary side. It can save cost for long stroke applications. The motor models of the specific embodiments 3 and 4 are much closer to traditional doubly-salient PM motor. However, it does not have the ability to modulate the magnetic field. There are more useless harmonic content in the air gap flux density, which limits the output thrust force. Meanwhile, the losses generated by these useless harmonics exacerbate the fever of the PMs, which go against to the heat dissipation of primary side. Chinese Invention Patent Application No. 201510209749.1 discloses a stator PM motor. Its structure is similar to doubly-salient PM motor. But from the magnetic field distribution and operation principle shown in FIG. 6, it is closer to flux-switching motor, not conventional doubly-salient motor. Although the motor creates a bipolar armature PM flux and smooth torque output, the motor places a PM every two stator salient teeth, and at the same time the flux of each winding turns is generated only by a piece of PM. The stator salient teeth do not have the ability to modulate magnetic field, which limits the magnitude of the back-EMF and output torque. Compared to the unilateral linear motor, the thrust force density of bilateral linear motor can be further improved, but there are not many studies on the DS linear PM motor. Chinese Invention Patent Application No. 201110000290.6 discloses a bilateral flux-switching linear PM motor, which can produce a stable thrust force. However, similar to ordinary flux-switching PM motor, it does not have the ability to modulate the magnetic field. Although the end magnetic flux leakage is limited compared to traditional unilateral flux-switching motor, the bilateral magnetic fields are not connected in series. Therefore, the effect is just simply superimposed by two unilateral motor, or even less than double times of a unilateral motor. Chinese invention Patent Application No. 201410259315.8 discloses a DS-LVPM motor. The two sides of the stator are only made of silicon steel sheet. Windings and PMs are located on the primary side, but PM is also fixed on the surface of the primary teeth, which cannot avoid serious magnetic flux leakage at the ends of the PMs, resulting in the low power factor and limiting the output thrust force. Its bilateral stators are perfectly symmetrical, which cause the magnetic circuit on both sides cannot be connected in series, so the effect is simply superimposed by unilateral motor. It cannot give full play of the characteristics of the magnetic field modulation effect.

SUMMARY OF THE PRESENT INVENTION

The object of the present invention is to overcome the shortage of high-performance LVPM motor and propose a high force density DS-LVPM motor and a design method to increase the magnetic field modulation effect.

Specifically, the motor of the present invention is to take the following technical solution to achieve:

A DS-LVPM motor, including primary, the first secondary and the second secondary, the first secondary and a second secondary are located on both sides of the primary, respectively. The first secondary, the second secondary and primary are separated by the air gap. The primary comprises the primary core, the PM, the armature windings. The primary core consists of a number of primary core elements. The end on both sides of the primary core elements are the armature teeth. The middle of the primary core central element is the yoke. The armature winding winds around the armature teeth, which is characterized in that:

The primary is bilaterally symmetrical structure. The primary core elements are cross-shaped structure, and each primary core element may constitute the primary core element group, or N primary core elements in series may constitute the primary core element group ($2 \leq N \leq 3$). Every two adjacent primary core element groups are connected with each other by PM in the yoke, and the thickness of PM in the vertical direction equals to the yoke thickness of the primary core element. The adjacent PMs have opposite excitation direction, and the horizontal component of the excitation of all the PMs cannot be zero, thus a bipolar PM magnetic field can be created.

When a primary core element separately constitutes a the primary core element group, between any two adjacent primary core elements, the adjacent armature teeth, the permanent magnet and the yoke can form the slots C with the same area. When $2 \leq N \leq 3$, within each primary core element group, the adjacent armature teeth and the yoke can form N−1 slots A, and between the adjacent two primary core element groups, the armature teeth, PM and the yoke can form slot B, and the slot A and the slot B have the same area. The first secondary and the second secondary are salient structure with the same teeth width, and the salient section is used as the modulation teeth. The first secondary and the second secondary are not completely symmetrical, and the centerline of modulation teeth of the first secondary coincides with the centerline of the slots of the second secondary, so the teeth of the first secondary can be opposite to the slots of the second secondary and the magnetic circuit on both sides can be realized in series.

Further, the top and bottom of the PM in the vertical direction is opposite to the middle of slot in the primary core element, and the number of PM is equal to the number of the primary core element group. The sum of the number of PM and the pole pair number of the armature winding is equal to the number of the salient teeth in the first secondary or the second secondary.

Further, the primary core uses straight slots structure or half-closed slot structure. The modulation teeth of the first secondary and the second secondary use straight tooth structure or skewed tooth structure.

Further, the primary core element group is composed of one primary core element.

Further, the half-closed slot structure of the primary core meets: $b_{s1}:T=0.6$, $b_{s1}:b_{s0}=4.2$, where $b_{s1}$, $b_{s0}$ and T represent the width straight slot portion, the slot opening width of pole shoe portion and the width of pole shoe, respectively.

The skewed tooth structure of first secondary and the second secondary meets: $s_1:s_2=3:2$, $d_1:d_2=2$, where $d_2$, $s_2$, $d_1$ and $s_1$ represent the top width of the modulation tooth, the bottom width of the tooth, the bottom width of the slot and the top width of the slot, respectively.

Further, the phase number of the armature winding ≥3 phases, and the armature winding uses distributed winding, which can be single or double winding.

Further, the PMs are made of ferrite or NdFeB material and are cuboid structure.

Further, the primary core element, the first secondary and the second secondary is just laminated by silicon steel sheet.

Further, the number of phase of the armature winding is 3 phases, and the pole pair number of PM is 12. The number of modulation teeth of the first secondary and the second secondary is 14 and the span of the armature windings is six teeth.

Technical solution of design method of the present invention is:

A design method to increase the magnetic field modulation effect for the high force density DS-LVPM motor includes the following steps:

Step 1: When the motor meets the relationship that the sum of the pole pair number of PMs and the pole pair number of the armature windings equals to the number of the teeth of the first secondary or the second secondary, determine a certain combination of the pole pair number of PMs and the number of modulation teeth.

Step 2: Keeping the secondary pole pitch constant, adjust the ratio of the top width of the modulation teeth $s_1$ and the bottom width of the modulation teeth $s_2$ of the first secondary and the second secondary $s_1:s_2$ and the length of the modulation teeth, to make the EMF of the motor reach the maximum value when the magnetic field in the motor does not enter the saturation condition.

Step 3: While keeping pole pitch of the primary constant, adjust the ratio of the width of the straight portion of the slot $b_{s1}$ and the width of the pole shoe T of the motor primary $b_{s1}:T$ and the width of the slot opening $b_{s0}$ to make the EMF of the motor reach the maximum value when the magnetic field in the motor does not enter the saturation condition.

Step 4: By adjusting the structure parameters of the PM, use finite element method (FEM) to calculate repeatedly to get the PM structure parameters corresponding to the maximum EMF when the magnetic field in the motor does not reach the saturation condition. The main structural parameters of the PM are: the width of the PMs $w_1$, the thickness of the PMs along the yoke of the primary core element $w_2$, the excitation direction of PMs (x, y). When designing and optimizing the excitation direction of PMs, the adjacent PMs should have opposite excitation direction, and the horizontal component of the excitation of all the PMs cannot be zero. While adjusting the structural parameters of the PMs, $w_1$, $w_2$ and (x, y) should be optimized at the same time.

Step 5: Adjust the ratio of the bottom width of the slot $d_1$ and the top width of the modulation tooth $d_2$ of the first secondary motor and the second secondary $d_1:d_2$ to minimize the detent force and maximize the EMF when the magnetic field in the motor does not reach the saturation condition.

Step 6: Adjust the combination between the pole pair number of PMs and the number of modulation teeth, and repeat the step 2, 3, 4, 5 to select the best the combination of the pole pair number of PMs and the number of modulation teeth corresponding to the maximum EMF.

The present invention has the following beneficial effects:

1. In the present invention, the PM is located between two primary core element groups and embedded in the yoke of the primary core element. The top and bottom of the PMs are in contact with the slots of the primary bilateral armature teeth, respectively, facing the middle of the slots. Adjacent PMs have opposite excitation direction and the magnetic field of PMs is bipolar. The number of the PMs equals to the number of primary core element groups. The sum of the pole pair number of PMs and the pole pair number of the armature windings equals to the number of the teeth of the first secondary or the second secondary. Apart from the above relationship, between every two primary core element groups, one PM should be embedded in the yoke. And the thickness of PMs equals to the thickness of the yoke of primary core elements. All these make the DS-LVPM motor have strong magnetic field modulation capability and have a very good effect of the magnetic field modulation, which can reduce the content of useless harmonic in the air gap. This design can suppress end flux leakage of the PMs, increase the effective magnetic flux, improve the utilization of the PMs and greatly improve the thrust force density. Further, when a primary core element separately constitutes a primary core element group, between any two adjacent primary core elements, the adjacent armature teeth, the PM and the yoke can form the slots C with the same area. When 2≤N≤3, the slot A and the slot B have the same area. This design can keep the turns of windings equal and make the length of air gap equal, so that the detent force of the motor and thrust force ripple further reduces and the EMF can be more sinusoidal.

2. In the present invention, apart from straight groove structure, the primary core is preferred to use semi-closed slot structure, which can improve the thrust force density while effectively suppress the thrust force ripple and make the EMF more sinusoidal. Apart from straight tooth structure, the secondary modulation teeth are preferred to use skewed tooth structure to reduce the detent force and enhance magnetic field modulation effect.

3. The present invention uses bilateral secondary structure, and two secondary are staggered half pole pitch with each other, which can provide effective circuit in series for the flux on both sides, make the magnetic field modulation effect maximize and the high EMF and force density can be reached. The PMs and windings are located on the motor primary, and secondary is just laminated by silicon steel sheet, which has simple structure and high mechanical strength. For linear long stroke applications, this structure can not only meet the thrust force requirements, but also save the usage of the PMs, greatly reducing the cost of investment. In the present invention, PMs and armature windings of the motor are all located on the primary to facilitate heat dissipation.

4. In the present invention, the design method to increase the magnetic field modulation effect for the DS-LVPM motor can reduce the risk of the core saturation in the motor, increase the utilization of the PM, and thus get the maximum EMF and thrust force density.

In summary, the DS-LVPM motor of the present invention puts the PMs and the armature winding on the motor primary and the secondary is just laminated by silicon steel sheet. Compared with the conventional linear synchronous PM motor, for long stroke applications, the usage of PM is less and the investment cost is lower. At the same time, the primary core element is cross-shaped structure. Between every two primary core element groups, one PM should be embedded in the yoke and adjacent PMs have opposite excitation direction. Compared to the unipolar magnetic field in the double salient PM motors, the magnetic field produced by PMs in this motor is bipolar. Compared to traditional surface mounted LVPM motor, the end flux leakage is suppressed so that the utilization of the PM is improved and high thrust force density can be obtained. Compared to the linear flux-switching PM motor, this motor can play a good magnetic field modulation effect. The DS-LVPM motor use dual-secondary structure, and the first secondary and second secondary are not completely symmetrical and staggered half pole pitch with each other. Compared with some of the existing symmetrically bilateral LVPM motors, the proposed motor can enhance the effect of the magnetic field modulation, achieve the magnetic circuit on both sides in series and obtain maximum EMF. Compared with the unilateral structure, this bilateral structure can achieve the effect of 1+1>2 for EMF and thrust force. The secondary modulation tooth can use helical tooth structure and the primary armature teeth can use semi-closed slot structure, which can reduce the thrust force ripple of the motor. Armature windings use distributed winding to get a high winding factor. A design method to increase the magnetic field modulation effect for the high force density DS-LVPM motor includes the following steps: By adjusting the structure parameters of the PM, when the magnetic field in the motor does not reach the saturation condition, use finite element method (FEM) to calculate repeatedly to get the PM structure parameters corresponding to the maximum EMF. The main structural parameters of the PM are: width of the PMs $w_1$, the thickness of the PMs along the yoke of the primary core element $w_2$, the excitation direction of PMs (x, y). This design can make the motor obtain best magnetic field modulation effect, reduce the risk of the core saturation in the motor, increase the utilization of the PM, and thus get the maximum EMF and thrust force density.

In the figures: 1, the motor primary 2, the primary core element 3, the PM 4, the armature winding 5, the armature teeth 6, the first secondary, 7, the second secondary, 8, modulation teeth 9, air gap 10, the slot A, 11, the slot B.

DETAILED DESCRIPTION OF THE PRESENT INVENTION

Combining with the figures of the embodiment of the present invention, the technical solution of the embodiment of the present invention will be described clearly and completely.

In the description of the invention, what should be understood is that location or position relationship that indicated by the terms "the center", "vertical", "horizontal" and "up", "down", "before" and "after", "left", "right" and "vertical", "level", "top", "bottom", "inside" and "outside" are based on the location or position shown in the appended drawings, only is to facilitate the description of this invention and simplified description, rather than instructing or implying that the referred devices or components must have a specific location or should be constructed and operated in a specific orientation, therefore cannot be interpreted as limiting the invention. In addition, the terms "first" and "second" are only used to describe the purpose, and cannot be understood as instructions or suggestions of the relative importance or impliedly point the number of indicated technical characteristics. Thus, it should be limited that the characteristics of the "first" and "second" can express or impliedly including one or more features. In the description of the invention, unless stated "multiple" means two or more than two.

Figure 1:
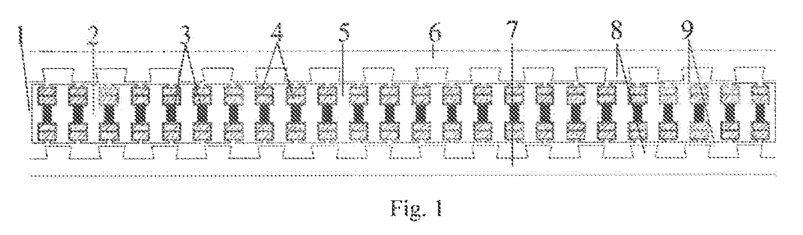
FIG. 1 is a schematic diagram of the structure according to the first embodiment of the present invention.
Figure 2:
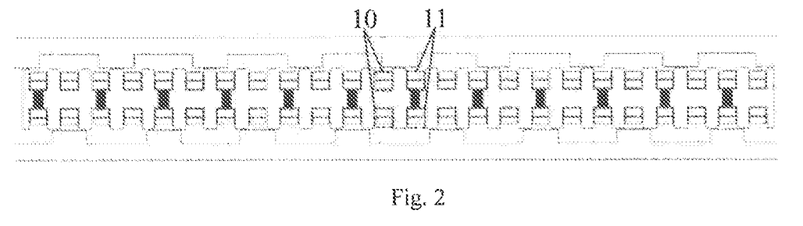
FIG. 2 is a schematic diagram of the structure according to the second embodiment of the present invention.
Figure 3:
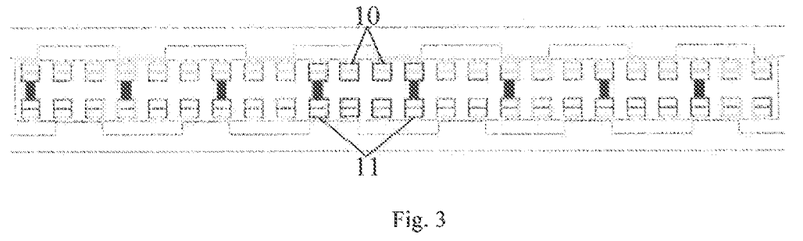
FIG. 3 is a schematic diagram of the structure according to the third embodiment of the present invention.

As shown in FIGS. 1-3, the present invention discloses a DS-LVPM motor and a design method to increase the magnetic field modulation effect. A DS-LVPM motor includes primary 1, the first secondary 6 and the second secondary 7, the first secondary 6 and a second secondary 7 are located on both sides of the primary 1, respectively. The first secondary 6, the second secondary 7 and primary 1 are separated by the air gap 9. The primary 1 comprises the primary core, the PM 3, the armature windings 4. The primary core consists of a number of cross-shaped primary core elements 2. The end on both sides of the primary core elements 2 are the armature teeth 5. The middle of the primary core element 2 is the yoke. The armature windings 4 are wound around the armature teeth 5. The primary 1 is bilaterally symmetrical structure. Each primary core element 2 may constitute the primary core element group, or N primary core elements 2 in series may constitute the primary core element group (2≤N≤3). Every two adjacent primary core element groups are connected with each other by PM 3 in the yoke, and the thickness of PM 3 in the vertical direction equals to the yoke thickness of the primary core element as shown in FIG. 1. When a primary core element 2 separately constitutes a the primary core element group, between any two adjacent primary core elements, the adjacent armature teeth 5, the PM 3 and the yoke can form the slots C with the same area. When 2≤N≤3, within each primary core element group, the adjacent armature teeth and the yoke can form N−1 slots A 10, and between two adjacent primary core element groups, the armature teeth, PM 3 and the yoke can form slot B 11, and the slot A 10 and the slot B 11 have the same area. The adjacent PMs 3 have opposite excitation direction, and the horizontal component of the excitation of all the PMs cannot be zero, and thus a bipolar PM magnetic field can be created.

The first secondary 6 and the second secondary 7 are salient structure with the same teeth width, and the salient section is used as the modulation teeth 8. The first secondary 6 and the second secondary 7 are not completely symmetrical, and the centerline of modulation teeth 8 of the first secondary 6 coincides with the centerline of the slots of the second secondary 7, so the teeth of the first secondary 6 can be opposite to the slots of the second secondary 7 and the magnetic circuit on both sides can be realized in series.

As the embodiment of the present invention, the above-mentioned PMs 3 are made of ferrite or NdFeB material and are cuboid structure. The primary core element 2, the first secondary 6 and the second secondary 7 is just laminated by silicon steel sheet. The top and bottom of the PM 3 in the vertical direction is opposite to the middle of slot in the primary core element, and the number of PM 3 is equal to the number of the primary core element group. The sum of the number of PM 3 and the pole pair number of the armature winding 4 is equal to the number of the salient teeth in the first secondary 6 or the second secondary 7. The armature windings 4 are wound around the armature teeth 5. The armature winding 4 uses distributed winding, which can be single or double winding, so that high winding factor and sinusoidal back-EMF can be obtained. The first secondary 6 and the second secondary 7 are salient structure with the same teeth width, and the modulation teeth 8 can use skewed tooth or straight tooth according to the specific requirements.

A design method to increase the magnetic field modulation effect for PM motor includes the following steps:

Step 1: When the motor meets the relationship that the sum of the pole pair number of PMs and the pole pair number of the armature windings equals to the number of the teeth of the first secondary or the second secondary, determine a certain combination of the pole pair number of PMs and the number of modulation teeth.

Step 2: Keeping the secondary pole pitch constant, adjust the ratio of the top width of the modulation teeth $s_1$ and the bottom width of the modulation teeth $s_2$ of the first secondary and the second secondary $s_1:s_2$ and the length of the modulation teeth, to make the EMF of the motor reach the maximum value when the magnetic field in the motor does not enter the saturation condition.

Step 3: While keeping pole pitch of the primary constant, adjust the ratio of the width of the straight portion of the slot $b_{s1}$ and the width of the pole shoe T of the motor primary $b_{s1}:T$ and the width of the slot opening $b_{s0}$ to make the EMF of the motor reach the maximum value when the magnetic field in the motor does not enter the saturation condition.

Step 4: By adjusting the structure parameters of the PM, use finite element method (FEM) to calculate repeatedly to get the PM structure parameters corresponding to the maximum EMF when the magnetic field in the motor does not reach the saturation condition. The main structural parameters of the PM are: the width of the PMs $w_1$, the thickness of the PMs along the yoke of the primary core element $w_2$, the excitation direction of PMs (x, y). When designing and optimizing the excitation direction of PMs, the adjacent PMs should have opposite excitation direction, and the horizontal component of the excitation of all the PMs cannot be zero. While adjusting the structural parameters of the PMs, $w_1$, $w_2$ and (x, y) should be optimized at the same time.

Step 5: Adjust the ratio of the bottom width of the slot $d_1$ and the top width of the modulation tooth $d_2$ of the first secondary motor and the second secondary $d_1:d_2$ to minimize the detent force and maximize the EMF when the magnetic field in the motor does not reach the saturation condition.

Step 6: Adjust the combination between the pole pair number of PMs and the number of modulation teeth, and repeat the step 2, 3, 4, 5 to select the best the combination of the pole pair number of PMs and the number of modulation teeth corresponding to the maximum EMF.

Embodiment 1

Figure 4:
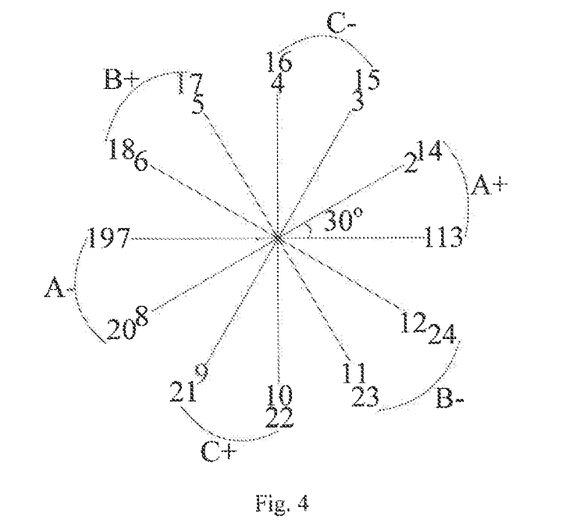
FIG. 4 is a star graph of slot according to the embodiment of the present invention.

In order to clarify the specific implementation, the invention will be illustrated following based on the three-phase motor in the additional figure. It can be seen that the yoke between every two primary core element 2 needs to embed a PM 3 and adjacent PMs are magnetized in the opposite direction. Thus, the magnetic field generated by PMs is bipolar, which is quite different from the unipolar PM magnetic field in the doubly salient PM motor. The pole-pair number of PMs of the motor in this invention is 12, and the number of secondary modulated teeth is 14, while its pole-pair number of armature windings is 2. The sum of the pole-pair number of PMs and the pole-pair number of armature windings should be equal to the number of modulated teeth. The motor adopts double-layer distributed winding. According to the theory of star graph of slot, the number of armature teeth of the motor is 24 and the number of the armature winding is 2. The star graph of slot of the motor in this invention is shown in FIG. 4. The span is 6, so as to get the maximum winding factor, back EMF and thrust force.

The FIG. 1 includes the primary 1, the first secondary 6 and the second secondary 7. The first secondary 6 and the second secondary 7 are respectively arranged on both sides of the primary 1, and the three are spaced by air gap. The primary 1 comprises primary core, PM 3 and the armature winding 4. The primary iron core is composed of several primary core element 2, whose bilateral end section is armature teeth 5 and the middle section is the yoke. The armature winding 4 winds on the tooth 5 and the primary 1 is bilateral symmetrical structure. If a primary core element group only consists of the primary iron core element 2, the adjacent armature teeth, PM3 and the yoke compose the slot C of the same area between any two adjacent primary core elements 2.

During the design process of the motor, the invention proposes a PM motor design method to obtain the optimal modulation of the magnetic field, so as to adjust the structural parameters of the PMs. When the magnetic field of the motor does not reach the saturation, it is available to calculate repeatedly based the finite element method to get the PM parameters till the maximum amplitude of back- EMF is obtained. In the optimization process, the width of PMs $w_1$, the thickness of PMs along the yoke of primary core element $w_2$ and the PMs magnetized direction (x, y) are optimized at the same time. Furthermore, the magnetized direction of the two adjacent PMs in the motor should be opposite and the horizontal component $_x$ cannot equal to zero during the design optimization.

Figure 5:
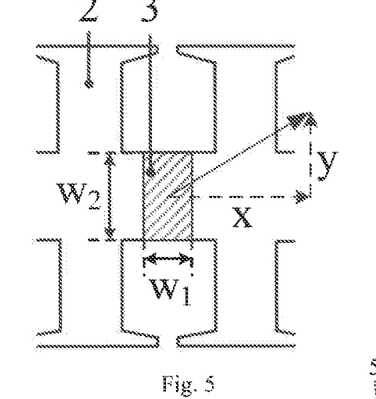
FIG. 5 is a structure parameter diagram of the PMs according to the embodiment of the present invention.

FIG. 5 shows the structure parameters of the PMs in this motor. The final width of the PM 3 accounts for half width of the slot 5 through the above design method. The thickness of the PM 3 is equal to the thickness of the yoke of the primary iron core element and its excitation direction is horizontal. Then, the magnetic field is not saturated and the EMF's reach the maximum value.

Figure 6:
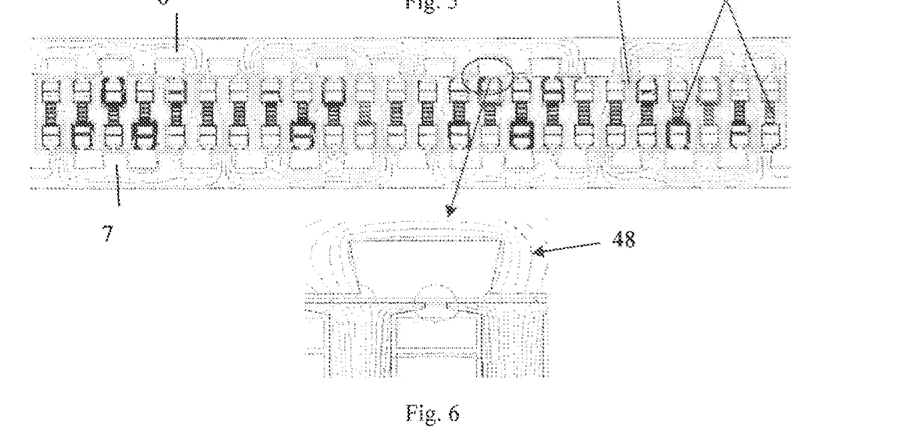
FIG. 6 is a diagram of magnetic flux distribution and magnetic flux leakage due to PMs according to the embodiment of the present invention.

FIG. 6 shows the flux distribution of the motor in this invention when the motor under no-load condition. It can be seen that the 12-pole-pair magnetic field is modulated by the 14 teeth. This modulation produces 2-pole-pair magnetic field which interacts with the 2-pole-pair armature winding filed. It proves that the modulation effect of vernier motor in the invention is effective. At the same time, it can be seen that the flux leakage 48 of the armature tooth at the end of the motor is very little, and the utilization rate of the PMs is very high.

Figure 7:
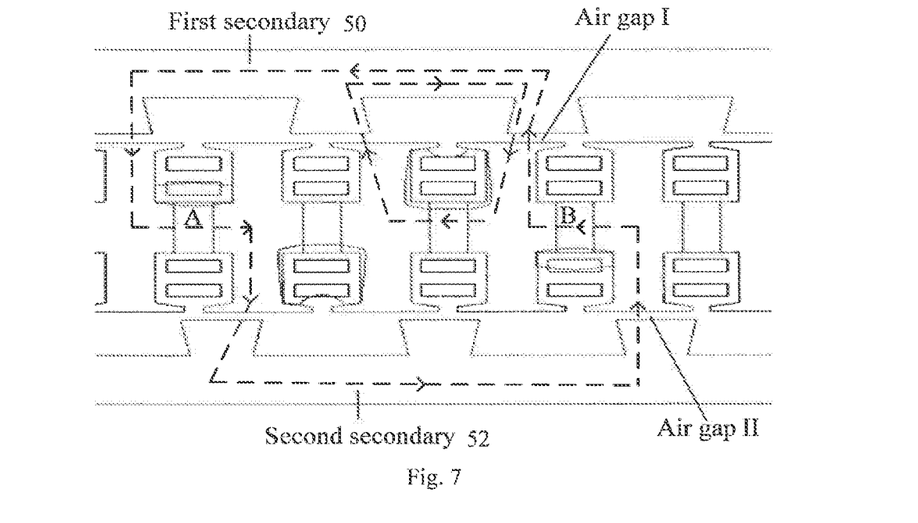
FIG. 7 is a diagram of two magnetic circuit according to the embodiment of the present invention.

FIG. 7 shows several paths of the flux of the motor in this invention. The flux only through a secondary starts from the N pole of the PMs, goes through the primary core, the air gap I, then walks through the first secondary, 50 across the air gap I and back to the primary. The flux continues to go through the primary core and arrives at the S pole of the PMs. Another flux circuit passes through the second secondary 52. It starts from the N pole of PM A, goes through the primary core, the air gap I, then goes across the first secondary 50, through the air gap I and back to the primary. Then it enters from another S pole of PM B and passes out from the N pole of it, goes through the primary iron core and air gap II, the second secondary 52, again cross the air gap II and back to the initial N pole of PM A. The second kind of magnetic circuit is in series of bilateral secondary, it can be seen that the structure of the double sides in this invention can improve the EMFs and output thrust force compared to the structure of single stator, achieving the effect of 1+1>2.

Figure 8A:
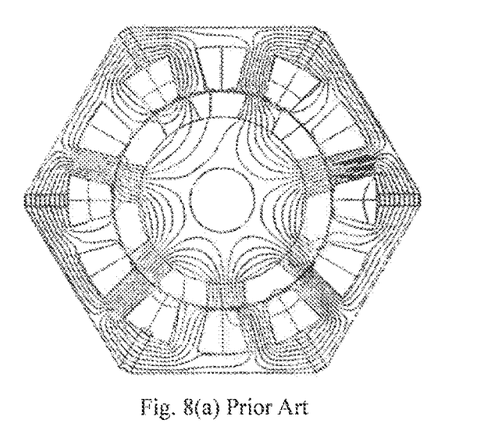
FIGS. 8(a) and 8(b) are diagrams of magnetic flux distribution of a doubly salient PM motor and a DS flux-switching PM motor according to the prior art.
Figure 8B:
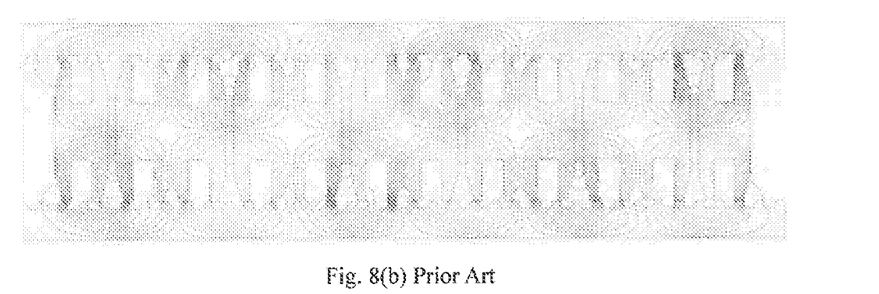

FIG. 8 (a) shows the flux distribution of the traditional doubly salient PM motor due to PMs. It can be seen that the pole pair number of magnetic field is equal to the pole pair number of the PMs without magnetic field modulation, which will lead to high harmonic content in the air gap. FIG. 8 (b) is the no-load flux distribution of a bilateral linear flux-switching PM motor in China patent No. 201110000290.6. It can be seen that the half flux passes the one side of the secondary and half flux goes through the other side of the secondary. The flux that passes the two sides has none in series and the pole pair number of magnetic field is same with the pole pair number of the PMs. Thus, there is no magnetic field modulation effect. Compared FIG. 6 with FIG. 7 and FIG. 8, the motor in the invention hilly exhibits the characteristics of the magnetic field modulation effect. The series magnetic circuit of both sides takes full advantage of the bilateral structure, so as to produce higher thrust force density.

Figure 9A:
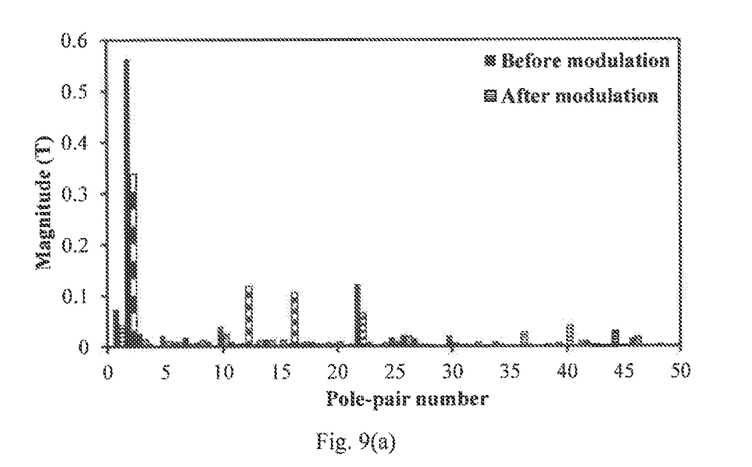
FIGS. 9(a) and 9(b) are diagrams of harmonic of air gap flux density according to the embodiment of the present invention.

FIG. 9 shows the harmonic spectra of the air gap flux density of the motor. FIG. 9(a) depicts the variation of the air gap flux density before and after modulation when PMs work alone. It can be seen that the main harmonics of the PMs in the air gap is $12^{th}$ and $36^{th}$ orders without modulation. After modulation, the amplitudes of all harmonic decrease and the amplitudes of $2^{nd}$ and $26^{th}$ orders increase.

Figure 9B:
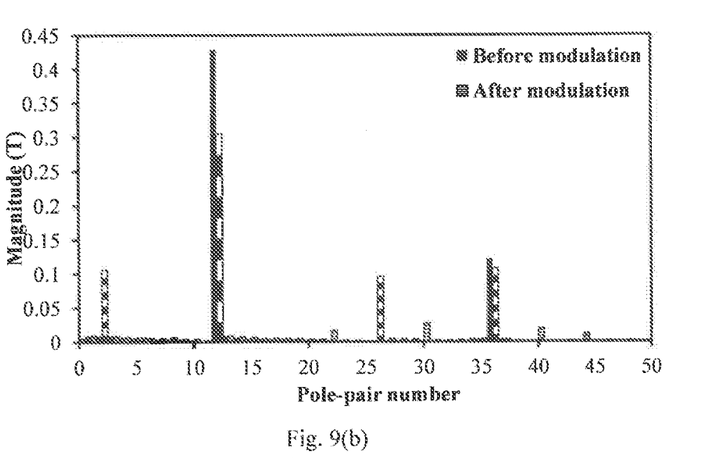

FIG. 9(b) shows the variation of the air gap flux density before and after modulation when armature windings work alone. It can be seen that the main harmonics of the armature windings generated in the air gap is $2^{nd}$ and $22^{th}$ orders. After modulation, the amplitudes of all harmonic decrease and the amplitudes of $2^{nd}$ and $22^{th}$ orders increase. When the motor is excited, the $2^{nd}$ and $12^{th}$ orders harmonic belonging to the permanent magnetic field and the armature magnetic field interact with each other to produce a stable thrust force.

Figure 10:
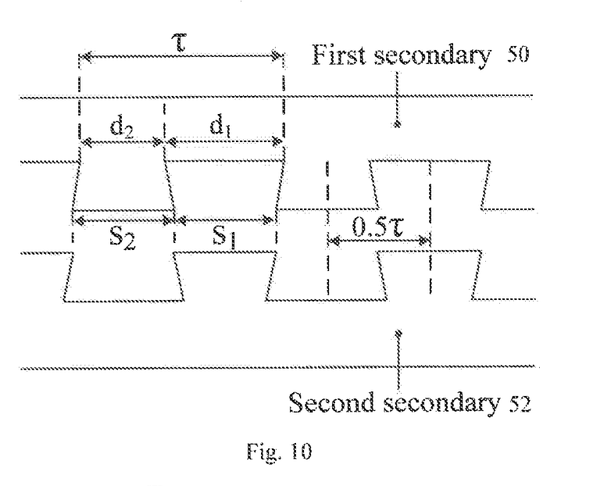
FIG. 10 is an enlarged diagram of the motor modulation teeth according to the embodiment of the present invention.

FIG. 10 shows the helical structure and relative position of the secondary modulation teeth 8 of the motor in the invention. The secondary pole distance is τ, and the top width of modulation tooth is $d_2$ while the bottom width of teeth is $s_2$. The bottom and top width of the slot are $d_1$ and $s_1$. The relationship among the four perimeters can be expressed as: $s_1:s_2=3:2$, $d_1:d_2=2$. The distance between two secondary is 0.5τ, which can make flux circuit connect in series on both sides to obtain the maximum back-EMFs and thrust force. It can be seen that the design of slot shape from the figure and the design of helical teeth can give full play the modulation effect and effectively suppress the fluctuation of the detent force of the motor.

Figure 11:
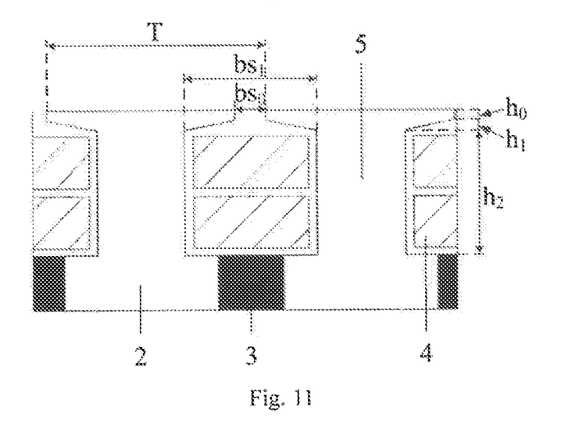
FIG. 11 is an enlarged diagram of the motor armature teeth according to the embodiment of the present invention.

FIG. 11 shows the design of a semi-closed slot of the primary core. The width of straight slot is $bs_1$, the height of slot is $h_2$, the width of pole pieces is T and its notch width is $bs_0$. The relationship among the four perimeters can be expressed as: $bs_1:T=0.6$, $bs_1:bs_0=4.2$. The height of straight part and skewed part of pole pieces are $h_0$ and $h_1$, so as to reduce the detent force and improve the sine quality of the back-EMF.

Figure 12:
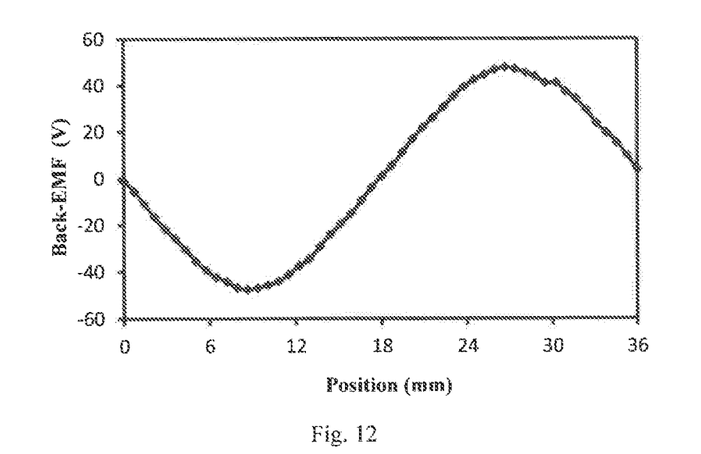
FIG. 12 is an EMF waveform of the motor according to the embodiment of the present invention.

FIG. 12 shows the waveform of the no-load back-EMF of the motor in this invention. It can be seen that the motor can generate very sinusoidal back-EMFs. It proves that the motor in this invention with special design that every two primary core element 2 embers a PM can fully play the magnetic field modulation effect. The special design can offer sinusoidal back-EMFs and high thrust force density, which meets the requirement of high performance.

Figure 13:
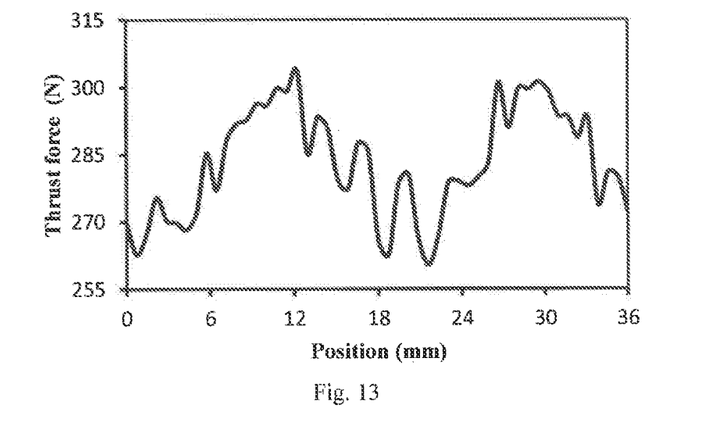
FIG. 13 is a thrust force waveform of the motor according to the embodiment of the present invention.

FIG. 13 shows the thrust force of the motor with the average value is 1.36 kN, which mainly results in the special design that every two primary core element 2 embed a PM. It leads to the good ability of magnetic field modulation, which can reduce the useless harmonic content in the air gap. At the same time, the design can suppress the magnetic leakage at the end of PM 3 and increase the effective flux, improve the utilization rate of the PMs, so as to obtain the high amplitude of back-EMFs and thrust force density. In addition, the first secondary 6 and second secondary 7 is not completely symmetrical, and the teeth of the first secondary can be opposite the slots of the second secondary. It leads to the circuit of both sides can be connected in series, which can improve the effective flux and achieve the effect of 1+1>2 when compared with the motor with unilateral structure. Therefore, the above design can improve back-EMFs and thrust force density of the motor. The thrust force density of the motor can be calculated by simulation and the value is 329 kN/m³, which is much larger than that of the traditional LVPM motor and the linear flux-switching PM motor.

Embodiment 2

As shown in FIG. 2, the invention discloses a DS-LVPM motor with high thrust force density and the design method to increase the magnetic field modulation effect. The DS-LVPM motor in the invention can also operate under five phase. The armature winding 4 is wound around the armature tooth 5 of the primary core element 2, and the winding can also use concentrated winding, single layer or double layer. The primary iron core element 2 adopts a straight groove structure, and the modulation teeth of the first secondary 6 and the second secondary 7 can also adopt the straight tooth structure. Every two primary core element 2 in series form a primary core element group and PM 3 is used to connect the adjacent yoke between the two primary core element groups. The area of teeth groove A10 and B11 are same.

In this invention, the windings and PMs of the LVPM motor are both located on the primary, which is convenient for heat radiation, while the secondary only consists of the laminated silicon steel. The use of long secondary structure in the long stroke applications can reduce the amount of PMs to save cost. At the same time, the design that yoke between every two teeth of the armature embeds a PM can make the motor have a good capability of magnetic field modulation. The design greatly suppresses the magnetic leakage, so as to produce high thrust force density.

Embodiment 3

As shown in FIG. 3, the invention discloses a DS-LVPM motor with high thrust force density and the design method to increase the magnetic field modulation effect. The DS-LVPM motor in the invention can also operate under five phase. The armature winding 4 is wound around the armature tooth 5 of the primary core element 2, and the winding can also be concentrated winding, single layer or double layer. The primary iron core adopts a structure of semi-closed slot, and the modulation teeth of the first secondary 6 and the second secondary 7 can also adopt the straight tooth structure. Every two primary core element 2 in series form a primary core element group and PM3 is used to connect the adjacent yoke between two primary core element groups. The area of teeth groove A10 and B11 are same.

In summary, the invention discloses a double stator LPM motor with high thrust force density of and a PM motor design method which can obtain the best magnetic field modulation effect. The motor includes the primary 1, the first secondary 6 and the second secondary 7. The first secondary 6 and the second secondary 7 are respectively arranged on both sides of the primary 1, and the three are spaced by air gap. The primary 1 comprises primary core, PM3, the armature winding 4 and armature tooth 5, and the secondary contains a modulation tooth 8. The primary of the motor is a bilateral symmetrical structure, the PM3 is embedded in the yoke of primary core element 2 and the yoke between every two teeth should be embedded in a PM to realize the magnetic field modulation effect. Furthermore, the magnetized direction of the adjacent PMs 3 should be opposite. The three-phase distributed armature winding 4 is wound on the armature tooth 5 of the primary iron core element 2, which can be single layer or double layer. The sum of the pole-pair number of PMs and the pole-pair number of armature windings should be equal to the number of modulated teeth. The first secondary 6 and the second secondary 7 are both salient pole structure with equal tooth width, and the modulating tooth can be helical or straight according to the specific requirement. The first and second secondary is not completely symmetrical. The teeth of the first secondary can be opposite the slots of the second secondary and the design makes two magnetic circuit in series, which can obtain the maximum EMFs and solve the problem of magnetic leakage at the end of the traditional VPM motor. Thus, it improves the utilization rate of the PM, so as to improve the thrust force density. The windings and PMs of the motor are both located on the primary, which is convenient for heat radiation, while the secondary only consists of the laminated silicon steel. The simple structure and high mechanical strength are suitable in the long stroke applications, such as transmission line and the rail traffic, which can greatly reduce the amount of PMs to save cost. The design method of getting the best magnetic field modulation effect of PM motor comprises the following steps: calculate repeatedly based on the FEM to get the parameters of the PMs structure till the EMFs reach the maximum value by adjusting the parameters of PMs structure. The parameters of PMs of the motor are mainly listed following: the width of PMs $w_1$, the thickness of PMs along the yoke of primary core element $w_2$ and the magnetized direction of PMs (x, y). Furthermore, the magnetized direction of the two adjacent PMs in the motor should be opposite and the horizontal component x cannot equal to zero during the design optimization. When adjusting the parameters of PMs, all parameters need to be optimized at the same time. By using this method of design, the optimum magnetic field modulation effect can be obtained, which can produce higher EMF and thrust force, so as to meet the needs of high performance.

In the description of the invention, it is necessary to state that, unless other specified rules and limits, the term "installation", "connection" and "link" should adopts generalized understanding. For example, it can be a fixed connection, a detachable connection, or an integral connection. Furthermore, it can be mechanical connection, electrical connection; directly connection, indirectly connection through the middle media or the internal connectivity between two components. The ordinary technical personnel in this field can understand the specific meaning of the term in the invention based on specific conditions.

As shown above, the invention proposes a double stator LVPM motor with high power factor and introduces it in details. In this paper, several examples are used to explain the principle and the method of implementation. What is to be explained is that the proposed examples in this invention are only the preferred ones, and are not limited to the invention. Any modification, replacement and improvement based on the spirit and principles of the invention should be included in the protection scope of this invention.

The invention claimed is:
1. A double-stator linear Vernier permanent magnet DS-LVPM motor includes a primary, and a first secondary and a second secondary located on both sides of the primary and separated by an air gap; wherein
   the primary comprises a primary core, a permanent magnet and armature windings;
   the primary core comprises a number of primary core elements in which ends on both sides of the primary core elements comprise armature teeth;
   a middle of the primary core element comprises a yoke; and
   armature windings are wound around the armature teeth;
   wherein the primary is a bilaterally symmetrical structure;
   the primary core elements are a cross-shaped structure, wherein each primary core element constitutes a primary core element group, or N primary core elements in series constitutes the primary core element group ($2 \leq N \leq 3$);
   adjacent yokes of every two primary core element groups are connected with each other by the permanent magnet in the yoke, and the thickness of the permanent magnet in the vertical direction equals to that of the yoke of the primary core element;

wherein adjacent permanent magnets have opposite excitation directions, and a horizontal component of the excitation in all permanent magnets cannot be zero, thus creating a bipolar permanent magnet magnetic field;

wherein when a primary core element separately constitutes a primary core element group, between any two adjacent primary core elements, adjacent armature teeth, the permanent magnet and the yoke forgo slots C with the same area;

wherein within each primary core element group, the adjacent armature teeth and the yoke form N−1 slots A, wherein 2≤N≤3, and between the adjacent two primary core element groups, the armature teeth, the permanent magnet and the yoke form a slot B, and a slot A and a slot B have the same area;

wherein the first secondary and the second secondary are salient structures with the same teeth width, and the salient section is used as the modulation teeth;

the first secondary and the second secondary are not completely symmetrical; and a centerline of modulation tooth of the first secondary coincides with a centerline of the slots of the second secondary, so that the teeth of the first secondary are opposite to the slots of the second secondary and a magnetic circuit on both sides can be realized in series.

2. The DS-LVPM motor according to claim 1, wherein a top and a bottom of the permanent magnet in the vertical direction is opposite to a middle of slot in the primary core element; a number of the permanent magnets is equal to a number of the primary core element group; and a sum of the number of permanent magnets and a pole pair number of the armature winding is equal to a number of salient teeth in the first secondary or the second secondary.

3. The DS-LVPM motor according to claim 2, wherein the primary core uses a straight slot structure or a half-closed slot structure, and the modulation teeth of the first secondary and the second secondary use a straight tooth structure or a skewed tooth structure.

4. The DS-LVPM motor according to claim 3, wherein the primary core element group is composed of only one primary core element.

5. The DS-LVPM motor according to claim 4, wherein the half-closed slot structure of the primary core meets the equation: $b_{s1}:T=0.6$, $b_{s1}:b_{s0}=4.2$, where $b_{s1}$, $b_{s0}$ and T represents the width straight slot portion, the slot opening width of pole shoe portion and the width of pole shoe, respectively, and the skewed tooth structure of the modulation teeth in the first secondary and the second secondary meets the equation: $s_1:s_2=3:2$, $d_1:d_2=2$, where $d_2$, $s_2$, $d_1$ and $s_1$ represent a width of a top of projecting modulation tooth, a width of a bottom of the tooth, a width of a bottom of the slot and a width of the top of the slot, respectively.

6. The DS-LVPM motor according to claim 5, wherein the phase number of the armature winding is 3 phases, and the pole pair number of permanent magnets is 12, a number of modulation teeth of the first secondary and the second secondary is 14, and the span of the armature windings is six teeth.

7. The DS-LVPM motor according to claim 4, wherein the phase number of the armature winding is 3 phases, and the pole pair number of permanent magnets is 12, a number of modulation teeth of the first secondary and the second secondary is 14, and the span of the armature windings is six teeth.

8. The DS-LVPM motor according to claim 2, wherein a phase number of the armature winding ≥3 phases, and the armature winding uses distributed winding, which can be single or double winding.

9. The DS-LVPM motor according to claim 8, wherein the phase number of the armature winding is 3 phases, and the pole pair number of permanent magnets is 12, a number of modulation teeth of the first secondary and the second secondary is 14, and the span of the armature windings is six teeth.

10. The DS-LVPM motor according to claim 2, wherein the permanent magnets are made of ferrite or NdFeB material and are cuboid structure.

11. The DS-LVPM motor according to claim 10, wherein the phase number of the armature winding is 3 phases, and the pole pair number of permanent magnets is 12, a number of modulation teeth of the first secondary and the second secondary is 14, and the span of the armature windings is six teeth.

12. The DS-LVPM motor according to claim 2, wherein the primary core element, the first secondary and the second secondary are all laminated by silicon steel sheet.

13. The DS-LVPM motor according to claim 1, wherein the primary core uses a straight slot structure or a half-closed slot structure, and the modulation teeth of the first secondary and the second secondary use a straight tooth structure or a skewed tooth structure.

14. The DS-LVPM motor according to claim 13, wherein the primary core element group is composed of only one primary core element.

15. The DS-LVPM motor according to claim 14, wherein the half-closed skit structure of the primary core meets the equation: $b_{s1}:T=0.6$, $b_{s1}:b_{s0}=4.2$, where $b_{s1}$, $b_{s0}$ and T represent the width straight slot portion, the slot opening width of pole shoe portion and the width of pole shoe, respectively, and the skewed tooth structure of the modulation teeth in the first secondary and the second secondary meets the equation: $s_1:s_2=3:2$, $d_1:d_2=2$, where $d_2$, $s_2$, $d_1$ and $s_1$ represent a width of a top of projecting modulation tooth, a width of a bottom of the tooth, a width of a bottom of the slot and a width of a top of the slot, respectively.

16. The DS-LVPM motor according to claim 14, wherein the phase number of the armature winding is 3 phases, and the pole pair number of permanent magnets is 12; the number of modulation teeth of the first secondary and the second secondary is 14, and the span of the armature windings is six teeth.

17. A method for increasing a magnetic field modulation effect for the DS-LVPM motor as claimed in claim 14, comprising the following steps:

Step 1: When the motor meets the relationship that the sum of the pole pair number of permanent magnets and the pole pair number of the armature windings equals to the number of the teeth of the first secondary or the second secondary, determine a certain combination of the pole pair number of permanent magnets and the number of modulation teeth;

Step 2: Keeping the secondary pole pitch constant, adjust a ratio of the top width of the modulation teeth $s_1$ and the bottom width of the modulation teeth $s_2$ of the first secondary and the second secondary $s_1:s_2$ and the length of the modulation teeth, to make the EMF of the motor reach a maximum value when the magnetic field in the motor does not enter the saturation condition;

Step 3: While keeping pole pitch of the primary constant, adjust a ratio of the width of the straight portion of the slot $b_{s1}$ and the width of the pole shoe T of the motor primary $b_{s1}$:T and the width of the slot opening $b_{s0}$ to make the EMF of the motor reach the maximum value when the magnetic field in the motor does not enter the saturation condition;

Step 4: By adjusting the structure parameters of the permanent magnet, use a finite element method (FEM) to calculate repeatedly to get the permanent magnet structure parameters corresponding to the maximum EMF when the magnetic field in the motor does not reach the saturation condition, wherein main structural parameters of the permanent magnet are: the width of the permanent magnets $w_1$, the thickness of the permanent magnets along the yoke of the primary core element $w_2$, the excitation direction of permanent magnets (x, y), wherein designing and optimizing the excitation direction of permanent magnets, the adjacent permanent magnets should have opposite excitation direction, and the horizontal component of excitation direction in all the permanent magnets cannot be zero, while adjusting the structural parameters of the permanent magnets, $w_1$, $w_2$ and (x, y) are optimized at the same time;

Step 5: Adjust a ratio of the bottom width of the slot $d_1$ and a top width of the modulation tooth $d_2$ of the first secondary motor and the second secondary $d_1$:$d_2$ to minimize the detent force and maximize the EMF when the magnetic field in the motor does not reach the saturation condition; and Step 6: Adjust a combination of the pole pair number of permanent magnets and the number of modulation teeth, and repeat steps 2, 3, 4 and 5 to select the best combination of the pole pair number of permanent magnets and the number of modulation teeth corresponding to the maximum EMF.

18. The DS-LVPM motor according to claim 1, wherein a phase number of the armature winding ≥3 phases, and the armature winding uses distributed winding, which can be single or double winding.

19. The DS-LVPM motor according to claim 1, wherein the permanent magnets are made of ferrite or NdFeB material and are cuboid structure.

20. The DS-LVPM motor according to claim 1, wherein the primary core element, the first secondary and the second secondary are all laminated by silicon steel sheet.

* * * * *

UNITED STATES PATENT AND TRADEMARK OFFICE
CERTIFICATE OF CORRECTION

PATENT NO. : 10,541,595 B2
APPLICATION NO. : 15/776397
DATED : January 21, 2020
INVENTOR(S) : Wenxiang Zhao et al.

Page 1 of 1

It is certified that error appears in the above-identified patent and that said Letters Patent is hereby corrected as shown below:

In the Claims

Claim 1, Column 13, Line 12 "yoke forgo slots" should be --yoke form slots--

Claim 15, Column 14, Line 35 "half-closed skit" should be --half-closed slot--

Claim 17, Column 14, Line 54 "claimed in claim 14" should be --claimed in claim 4--

Signed and Sealed this
Seventh Day of April, 2020

Andrei Iancu
*Director of the United States Patent and Trademark Office*